United States Patent
Soenkens et al.

(10) Patent No.: US 11,822,661 B2
(45) Date of Patent: Nov. 21, 2023

(54) METHOD FOR CARRYING OUT A SECURED STARTUP SEQUENCE OF A CONTROL UNIT

(71) Applicant: Robert Bosch GmbH, Stuttgart (DE)

(72) Inventors: Andreas Soenkens, Remseck Am Neckar (DE); Bjoern Kasper, Pleidelsheim (DE); Jens Schmuelling, Ludwigsburg (DE); Thorsten Schwepp, Korb (DE)

(73) Assignee: ROBERT BOSCH GMBH, Stuttgart (DE)

( * ) Notice: Subject to any disclaimer, the term of this patent is extended or adjusted under 35 U.S.C. 154(b) by 219 days.

(21) Appl. No.: 17/356,060

(22) Filed: Jun. 23, 2021

(65) Prior Publication Data
US 2021/0406375 A1    Dec. 30, 2021

(30) Foreign Application Priority Data
Jun. 25, 2020   (DE) .......................... 102020207861.0

(51) Int. Cl.
*G06F 1/08* (2006.01)
*G06F 21/57* (2013.01)
(Continued)

(52) U.S. Cl.
CPC ............... *G06F 21/57* (2013.01); *G06F 1/08* (2013.01); *G06F 8/65* (2013.01); *G06F 21/44* (2013.01);
(Continued)

(58) Field of Classification Search
CPC ... G06F 21/57; G06F 1/08; G06F 8/65; G06F 21/44; G06F 2221/033; H04L 9/3234; H04L 9/3242; H04L 9/3247
See application file for complete search history.

(56) References Cited

U.S. PATENT DOCUMENTS

| 8,383,215 B2 | 2/2013 | Shi et al. |
| 9,536,455 B2 | 1/2017 | Benasillo |

(Continued)

FOREIGN PATENT DOCUMENTS

| DE | 102015209116 A1 | 11/2016 |
| WO | 2017023472 A1 | 2/2017 |

OTHER PUBLICATIONS

Petri, Richard et al. "Evaluation of lightweight TPMs for automotive software updates over the air" 4th escar USA, 2016. URL: ftp://www.pwg.org/pub/pwg/liaison/escar/tpm_paper_2016-0513-final.pdf. Retrieved from the Internet on Sep. 15, 2020. 15 Pages.

*Primary Examiner* — Aurel Prifti
(74) *Attorney, Agent, or Firm* — NORTON ROSE FULBRIGHT US LLP; Gerard Messina

(57) ABSTRACT

A method for carrying out a secured startup sequence of a control unit, which includes a host that is configured to execute a loader program and one or multiple application programs, and a hardware security module (HSM) which includes a program memory and a data memory. The method includes a starting of the host and of the HSM; an authentication of the loader program by the HSM with the aid of a loader program signature stored in the program memory of the HSM; and, an execution of the loader program by the host if the authentication of the loader program is successful.

11 Claims, 2 Drawing Sheets

(51) Int. Cl.
*G06F 21/44* (2013.01)
*H04L 9/32* (2006.01)
*G06F 8/65* (2018.01)

(52) U.S. Cl.
CPC .......... *H04L 9/3234* (2013.01); *H04L 9/3242* (2013.01); *H04L 9/3247* (2013.01); *G06F 2221/033* (2013.01)

(56) References Cited

U.S. PATENT DOCUMENTS

| | | | | |
|---|---|---|---|---|
| 10,412,191 | B1* | 9/2019 | Brandwine | G06F 9/5077 |
| 11,074,371 | B2* | 7/2021 | Ignatchenko | G06F 21/575 |
| 2011/0320823 | A1* | 12/2011 | Saroiu | H04L 9/3247 |
| | | | | 713/189 |
| 2013/0097609 | A1* | 4/2013 | Li | G06F 1/329 |
| | | | | 702/58 |
| 2017/0212746 | A1* | 7/2017 | Quin | H04L 63/123 |
| 2017/0310684 | A1* | 10/2017 | Wagner | H04L 9/3242 |
| 2018/0341496 | A1* | 11/2018 | Huntley | G06F 15/7867 |
| 2021/0070237 | A1* | 3/2021 | Troia | H04L 9/0866 |
| 2021/0263746 | A1* | 8/2021 | Thom | G06F 21/78 |
| 2021/0406361 | A1* | 12/2021 | Soenkens | G06F 21/445 |

\* cited by examiner

METHOD FOR CARRYING OUT A SECURED STARTUP SEQUENCE OF A CONTROL UNIT

CROSS REFERENCE

The present application claims the benefit under 35 U.S.C. § 119 of German Patent Application No. DE 102020207861.0 filed on Jun. 25, 2020, which is expressly incorporated herein by reference in its entirety.

FIELD

The present invention relates to a method for carrying out a secured startup sequence of a control unit as well as to a processing unit and to a computer program for carrying out the method.

BACKGROUND INFORMATION

Programmable control units are used in machines and vehicles in order to control the latter or also components thereof. For example, a vehicle may contain control units for engine control, for the braking system, etc. The control units include a processor including one or, typically including multiple processor cores (also simply referred to as host or host system), which execute programs stored in a memory in order to achieve the functions of the control unit.

For safety reasons, it may be provided that before a program is executed by the control unit, the authenticity of the program is checked, in order to prevent a manipulated program from being executed. For this purpose, it may be checked whether a memory area in which the program is stored is unchanged. This is carried out by a so-called hardware security module HSM, which provides functionalities in order to secure programs executed by the control unit and communication from manipulation. The HSM uses cryptological functions, signatures and (secret) keys for this purpose. The signatures and keys are stored by the HSM in a data memory, which is initialized during the startup of the control unit. Typically, the loader program of the host, which loads, in particular, an application program, must initially be checked for authenticity when starting the control unit. Delays may result in this case due to the necessary initialization of the data memory, which is carried out by the HSM at a reduced clock frequency.

SUMMARY

According to the present invention, a method is provided for carrying out a secured startup sequence of a control unit as well as a processing unit and a computer program for carrying out the method. Advantageous example embodiments of the present invention are disclosed herein.

In accordance with an example embodiment of the present invention, because a loader program signature is situated in the program memory of the HSM, which is protected by the HSM, i.e., secured against manipulations, and which may be accessed immediately with the startup of the HSM without having to wait for an initialization of the data memory of the HSM, it is therefore possible even with a potentially further reduced clock frequency of the HSM to carry out a secured and fast startup sequence in a way that makes the securing of control units used in time-critical applications (for example, engine control units) possible. The method for carrying out a secured startup sequence of a control unit is, in other words, a secured control unit startup sequence.

The term "startup sequence" or startup refers in this case to steps carried out by the control unit initially after the startup until application programs, which implement the actual control functionality of the control unit, are up and running. "Secured" is intended to mean that it is not possible to manipulate the startup sequence in such a way that programs are executed, which change the functionality of the control unit in an unauthorized manner, i.e., change in a manner not authorized by the manufacturer and/or user of the device (for example, machine or vehicle), in which the control unit is used, or which enable an attacker to acquire control of the control unit and thus at least partially of the device controlled by this control unit. The loader program signature constitutes a reference signature for the loader program.

In accordance with an example embodiment of the present invention, the host or the host system includes a processor (host core), which is configured to execute software or computer programs (referred to simply as programs), in order to implement functions of the control unit. The host may include further elements such as, for example, a (volatile) working memory (for example, a direct access memory, random access memory, RAM), a non-volatile host memory (for example, a flash memory), communication interfaces, in particular, for communication with the host memory, with the HSM and with external devices and/or the like. Software is contained or stored in the host memory, which is non-volatile, for example, in a flash memory, a hard disk or an SSD (solid state disk). The host memory is re-writable.

The programs may include one or multiple application programs, which are configured to implement control functions of the control unit when they are carried out by the host, a loader program, which is configured to carry out initializations and to call up at least one of the application programs when it is executed by the host, and an update program (programming software), which is configured to, among other things, rewrite the host memory or parts thereof with software (program data) or data when it is executed by the host. With the aid of the update program, which basically represents a programming software for reprogramming the control unit, it is possible to update or re-program the control unit. The update may relate to programs, whose sequence determines the function of the control unit, and/or data, which are required for the function of the control unit, for example, initializing parameters or program parameters. When updating or re-programming, the host memory or areas thereof are entirely or partially rewritten with update data (new programs, i.e., software, and/or other new data). The update program may optionally, if necessary, carry out further actions, for example, determining which programs/data must be updated, or prompt a restart of the control unit after the update.

In accordance with an example embodiment of the present invention, the hardware security module, referred to in short as HSM, includes a processor (HSM core) and an HSM memory, which includes a program memory and a data memory. The HSM provides cryptographic functions, which may be utilized by the host in order to secure safety critical functions, for example, the communication of multiple control units among one another. For this purpose, the HSM maintains, in particular, secret passwords (code words), cryptographic keys and/or signatures and implements cryptographic methods preferably in hardware. These passwords, keys and/or signatures are stored by the HSM. The host core may be designed separately from the host or may be integrated with the host or with the host processor and the memory in one chip (HSM and host are then formed, for example, by various processor cores on the chip). The HSM is configured, in particular, to check the integrity of memory areas of the host memory in order to check the authenticity of computer programs contained in the respective memory area or of software and/or data contained therein.

In accordance with an example embodiment of the present invention, in the integrity check, it is determined whether the content of the memory area (of the host memory) to be checked is unchanged compared to a content known to be correct. This takes place preferably by a comparison of signatures, a signature maintained by the HSM and stored in the HSM memory (i.e., a reference signature), which corresponds to an (earlier) state of the memory area, about which it is known that this memory area is correct (not manipulated), being compared with a newly calculated value of the signature, which is calculated based on the instantaneous content of the memory area. If the newly calculated signature value is identical to the stored signature (reference signature), then the content of the memory area (in terms of the signature comparison) is unchanged, the authenticity of the program is then confirmed. If, on the other hand, the newly calculated signature value is not identical to the stored signature (reference signature), then the content of the memory area (in terms of the signature comparison) is changed, the authenticity of the program is then not confirmed.

For example, a check value or a hash value of the data stored in the memory area may be calculated and may be compared to a value calculated at an earlier point in time, at which it was known that the memory area contained correct, non-manipulated software and/or data. A matching of a MAC, i.e. a message authentication code, preferably takes place for the integrity check. A secret key, which is administered by the HSM, is incorporated in the calculation of a MAC in addition to the original message, in this case, the data stored in the memory area, or a hash value thereof. In this way, so-called collision attacks (or, in this case, pre-image attacks) may be prevented. A so-called CMAC (cipher-based message authentication code) is preferably used. These cited methods (check value, hash value, MAC, CMAC) represent preferred examples of possible signature methods, however, another conventional method may also be used, for example, conventional digital signatures.

In accordance with an example embodiment of the present invention, the method may include preferably initializing the data memory of the HSM after the authentication of the loader program. The method may further preferably include an increase of a clock frequency of the HSM after the initialization. These steps enable the quick access to application program signatures stored in the data memory of the HSM and to other data stored there (e.g., passwords, etc.).

In accordance with an example embodiment of the present invention, the method further includes, subsequent to the execution of the loader program, preferably an authentication of at least one of the one or of the multiple application programs with the aid of at least one application program signature stored in the data memory of the HSM; and, if the authentication of the at least one application program is successful, an execution of the at least one application program by the host. In this way, the execution of manipulated application programs is prevented.

In accordance with an example embodiment of the present invention, the method may preferably include, if the at least one application program is an update program for the loader program of the host, an updating of the loader program by the update program; a determination or calculation of a changed loader program signature of the updated loader program of the host; a writing of the changed loader program signature into the program memory of the HSM; and, preferably a restart of the control unit. If, during the update, for example, a new version of the loader program is installed, it is thereby ensured that this new version may be correctly authenticated.

The authentication of the loader program and/or of the at least one application program may preferably include a calculation of a signature, in particular of a digital signature or of a message authentication code, MAC, of a memory area, in which the loader program or the at least one application program is stored, and a comparison of the calculated signature with the loader program signature or application program signature, the authentication being defined as successful if the calculated signature is identical to the loader program signature or application program signature, and the authentication being defined as unsuccessful if the calculated signature is not identical to the loader program signature or application program signature. When using a signature comparison for authenticating programs, the reliability of the authentication is ultimately a function of the strength of the signature method against attacks. Thus, a high degree of manipulation safety may be ensured by the selection of an appropriate signature method.

In accordance with an example embodiment of the present invention, the method may preferably include stopping the control unit and/or sending or outputting an error message if the authentication of the loader program and/or of the at least one application program is unsuccessful. This may prevent a potentially manipulated control unit from running further and from potentially erroneously executing safety-critical functions. The error message may be output to a user. It is equally possible to forward the error message to one or to multiple other control units. For example, motor vehicles include a multitude of control units; if one of these, for example, a control unit for the braking system, establishes with the aid of a failed authentication a possible manipulation attempt, this control unit may output or send a corresponding error message to other control units, so that these respond thereto, for example, are unable to start or stop; for example, an engine control unit could stop the engine if the control unit of the braking system reports a potential manipulation attempt.

In accordance with an example embodiment of the present invention, the method may include preferably a writing of the loader program signature into the program memory of the HSM. This takes place (apart from the above-described update method), in particular, during an initial initialization or programming of the control unit in secure surroundings (for example, during the production of the control unit or during installation of the control unit into a machine or a motor vehicle). In this way, it is possible to ensure a loader program signature consistent with the originally uploaded loader program.

A processing unit according to the present invention, for example, a control unit of a motor vehicle is, in particular, programmatically configured to carry out a method according to the present invention.

The implementation of a method according to example embodiments of the present invention in the form of a computer program or computer program product including program code for carrying out all method steps is also advantageous, since this generates particularly low costs, in particular, if an executing control unit is also utilized for further tasks and is therefore already present. Suitable data media for providing the computer program are, in particular, magnetic, optical and electrical memories such as, for example, hard disks, flash memories, EEPROMs, DVDs and the like. A download of a program via computer networks (Internet, Intranet, etc.) is also possible.

Further advantages and embodiments of the present invention result from the description herein and the figures.

The present invention is schematically represented in the drawings based on exemplary embodiments and is described below with reference to the figures.

DETAILED DESCRIPTION OF EXAMPLE EMBODIMENTS

Figure 1:
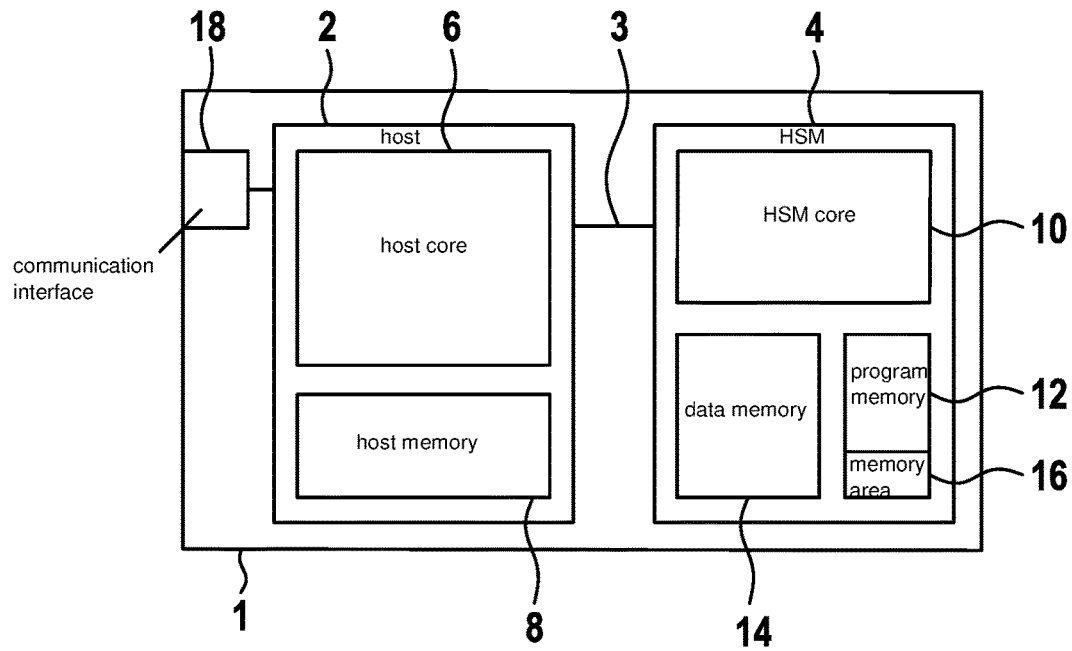
FIG. 1 shows the basic setup of a control unit on which the present invention may be based, in accordance with an example embodiment of the present invention.

FIG. 1 shows the basic setup of a control unit or of a processing unit contained in a control unit, on which the present invention may be based. In this case, essentially only those components are shown, which are necessary for understanding the present invention.

Control unit 1 includes a host 2 and a hardware security module (HSM) 4. These are interconnected with the aid of one or of multiple connections or lines 3 for exchanging data. It may also be a serial or parallel connection. The connection may be a point-to-point connection or may also be implemented via a bus.

Host 2 includes a host core 6, i.e., a processor, and a host memory 8, in which programs, in particular, a loader program and application programs, and data are stored. Host core 2 is configured to execute programs stored in host memory 8.

HSM 4 includes an HSM core 10, i.e., a processor, a program memory 12 for programs to be executed by the HSM core, and a data memory 14, in particular, for signatures and keys. In program memory 12, a memory area 16 is provided, in which a signature (or reference signature) for the loader program of the host (referred to as loader program signature) is stored. Program memory 12 and data memory 14 differ insofar as program memory 12 may be accessed immediately with the start of HSM 10, whereas data memory 14 must first be initialized. Thus, the data memory in this case has slower access times.

For the sake of completeness, a communication interface 18 is also shown, which serves to connect control unit 1 to other devices. These may be, in particular a device to be controlled by the control unit and/or other control units. A programming device, with which an update of the control device is to be carried out, may also communicate with the control unit via communication interface 18. In addition to other interfaces, communication interface 18 may include a CAN bus interface, for example. Communication interface 18 in this case is directly connected to host 2, but may, for example, also be connected via a bus.

Multiple or also all of the individual parts (host 2, HSM 4, memories 8, 12, 14, communication interface 18) may be integrated in one chip. Contrary to that shown, memories 8, 12, 14 may also be implemented separately (separate chip) from each core. The three memories (host memory 8, program memory 12 of the HSM and data memory 14 of the HSM) may also be at least partially integrated with one another. A shared memory, in particular a flash memory, is typically provided, in which various memory areas are provided for host memory 8, program memory 12 of the HSM and data memory 14 of the HSM. The memory areas corresponding to program memory 12 and data memory 14 of the HSM are then reserved by hardware mechanisms for the HSM, the host is thus unable to access them. The shared memory may be connected to the host core and to the HSM core via individual connections or via a bus. The shared memory may (for example, as a flash bank) be integrated together with the host core and the HSM core in one chip. The control unit may include further components not shown.

Figure 2:
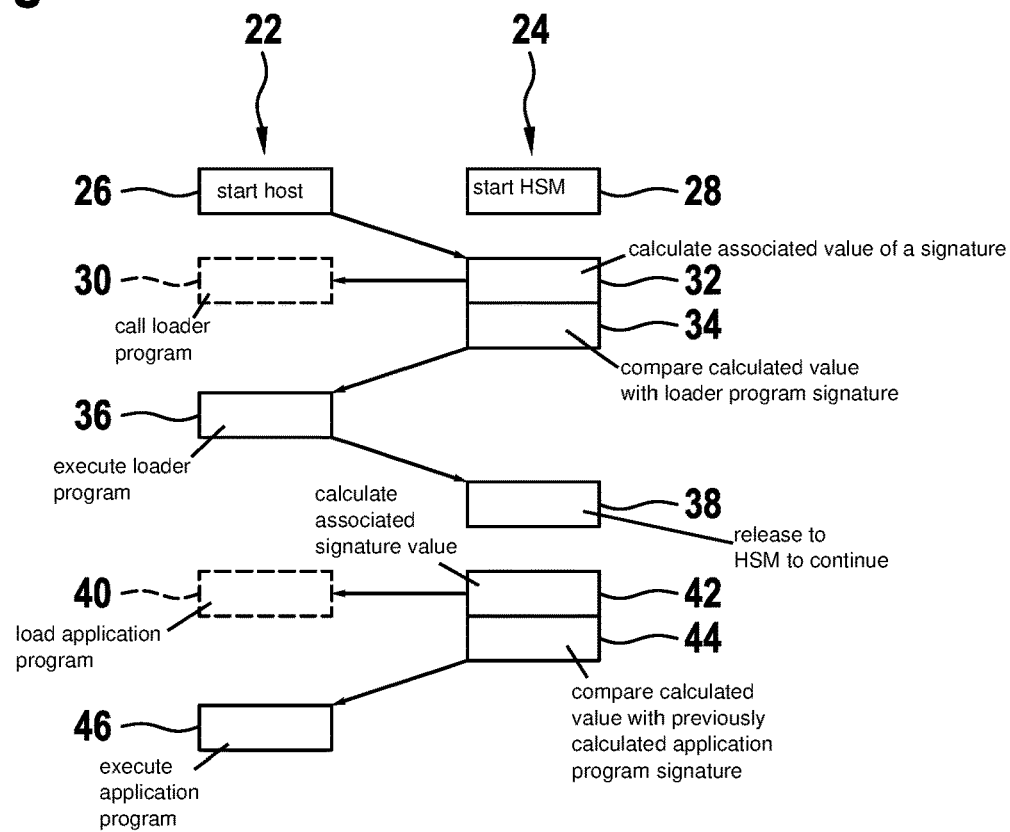
FIG. 2 shows an overview of the basic structure of one preferred specific embodiment of the method for carrying out a secured startup sequence of a control unit, in accordance with the present invention.

An overview of the basic structure of one preferred embodiment of the method for carrying out a secured startup sequence of a control unit is shown in FIG. 2. Processes are shown to the left in the figure, which run on host side 22 and processes are shown to the right in the figure, which run on HSM side 24. Arrows represent relationships or interactions between individual elements, i.e., in general not the temporal sequence of successive steps in the manner of a flowchart. The arrangement of the elements drawn in the vertical direction of the figure roughly corresponds to the temporal sequence, however, this arrangement does not necessarily correspond exactly to the actual temporal sequence, i.e., it is possible that processes situated at identical vertical heights take place at different points in time, or processes situated at different heights proceed simultaneously or in reverse sequence, as long as this is consistent with the logical sequence of the method.

The host is initially started by starting up or switching on the control unit in step 26 and the HSM is started in step 28. In the process, a firmware is typically executed by the host, which carries out or provides basic initializations and functions. A loader program 30 of the host is then called up by the firmware, which may carry out the further initializations (for example, those relating to a specific use of the control unit) and loads one (or multiple) application programs, i.e., a software, which implements the actual control function of the control unit.

Loader program 30 is not immediately executed, however, rather the execution is prevented until it is unblocked by the HSM, which initially checks the authenticity of the loader program. This may occur by checking the integrity of the memory area in which the loader program is stored, i.e., it is checked whether the memory area has been changed in an unauthorized manner.

For this purpose, an associated value of a signature, for example, of a digital signature or a message authentication code, is initially calculated in step 32 based on the data in this memory area. This signature value, which is based on the instantaneous content of the memory area, is compared in step 34 with a loader program signature, which has been calculated at an earlier point in time at which the content of the memory area was known not to be manipulated. The loader program signature that is used for comparison is stored in the program memory of the HSM, so that this signature may still be read out before initialization of the data memory of the HSM. The sequence therefore includes the step of reading out not further shown of the loader program signature from the program memory of the HSM. The authentication of the loader program may therefore be immediately carried out even at initially reduced clock frequency of the HSM and the startup sequence of the control unit may accordingly be run through quickly.

If the authenticity of the loader program is confirmed by the comparison in step 34, i.e., if the instantaneously calculated signature value is identical to the stored loader program signature, the execution of the loader program is authorized and the loader program is executed in step 36. The loader program prompts the release to the HSM to continue with its further start process, in particular, using an initialization of the HSM data memory, which is carried out in step 38.

The loader program further loads at least one application program 40, which is preferably not immediately executed by the host, but only after a successful authentication check by the HSM. In this case, the procedure is similar to the authentication check of the loader program. An associated signature value (such as above, for example, the value of a digital signature or of a message authentication code) is initially calculated in step 42 based on the content (i.e., on the program data) of a memory area, in which the application program is stored, and this signature value is then compared in step 44 with a previously calculated application program signature, which is associated with a previous state of the content of the memory area known to be correct. If the instantaneously calculated signature value is identical to the previously calculated application program signature, the execution of the application program is unblocked and this application program is executed in step 46. The application program signatures—in general, multiple application programs are present, which are either loaded or called up by the loader program during the control unit startup or are called up later by other application programs—are stored in the data memory of the HSM, which is now initialized and which may be correspondingly quickly accessed. Alternatively, further reference signatures may also be loaded into the HSM-RAM (i.e., into the volatile working memory of the HSM) immediately after the initialization of the HSM data memory.

Figure 3:
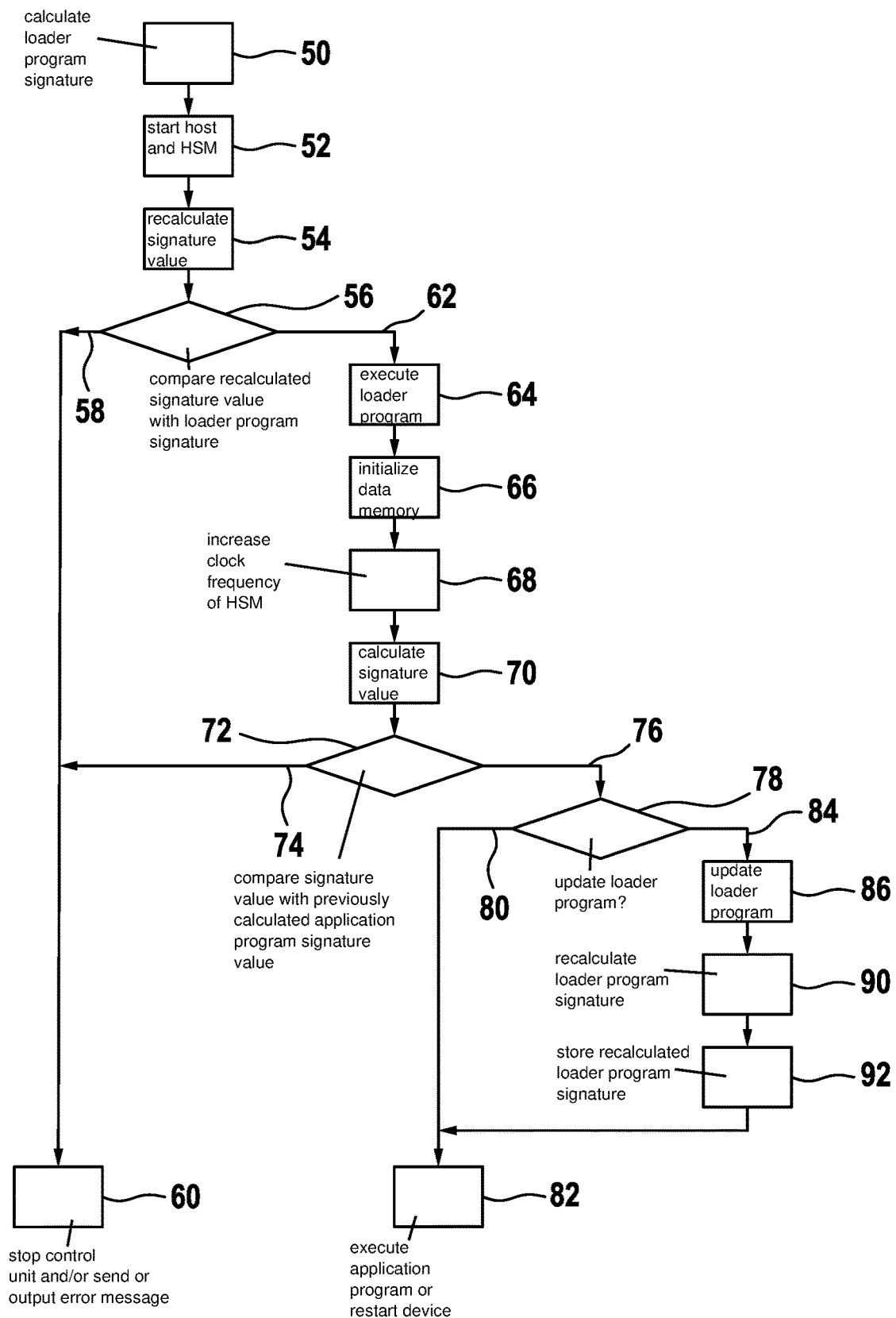
FIG. 3 shows a flowchart of one preferred specific embodiment of the method according to the present invention.

FIG. 3 represents a flowchart of one preferred specific embodiment of the method according to the present invention. The secured control unit startup sequence begins, in principle, with step 52, the start of the host and of the HSM, the host core and the HSM core, in particular, being started. A previous step 50 is additionally shown, in which a loader program signature, i.e., a cryptographic reference signature with which the authenticity of the loader program may be checked, is calculated and is stored in the program memory of the HSM. Such a cryptographic signature may, for example, be provided by a digital signature or by a message authentication code (MAC). The calculation is based on the memory area in which the loader program is contained or is stored. In the process, a signature is calculated from the loader program data contained in this memory area. The value of the signature calculated at the reference point in time, which corresponds to a correct state, i.e., non-manipulated state, of the memory area, is the loader program signature (i.e., the loader program reference signature), on the basis of which the integrity of the memory area may be checked. This step 50 is carried out, for example, during the manufacture of the control unit or of the initial programming of the control unit.

In step 54, the signature value is recalculated, based on the instantaneous, i.e., at the start point in time, content of the memory area of the loader program. This (re)calculated signature value is compared in step 56 with the loader program signature stored in the program memory of the HSM in order to check the integrity of the memory area, i.e., to check whether the memory area and, therefore, the loader program is unchanged. For this purpose, the loader program signature is read out from the program memory of the HSM in a step not further shown. These calculations and the comparison may be carried out by the HSM.

If the calculated signature value and the loader program signature are not identical, the check of the authenticity of the loader program is unsuccessful, arrow 58. In this case, the control unit is stopped and/or an error message is sent (for example, to other control units) or output (for example, on a display device of the control unit) in step 60.

If the calculated signature value and the loader program signature are identical, the check of the authenticity of the loader program is successful, arrow 62. In this case, the loader program is executed in step 64. The loader program carries out, for example, a more extensive initialization of the control unit. The loader program may, in particular, prompt an initialization of the data memory, which is carried out in step 66. After initialization, an increase in the clock frequency of the HSM, in particular, of the HSM core is preferably provided in step 68. The loader program loads at least one application program preferably at the end of the startup sequence, via the execution of which at least one control function of the control unit is implemented.

The authenticity of the (at least one) application program is advantageously checked by the HSM before being executed. For this purpose, a signature value is calculated in step 70 based on the memory area in which the application program is stored. The signature value is compared in step 72 with a previously calculated application program signature stored in the data memory of the HSM, the application program signature thus being based on a state of the memory area of the applications program known to be non-manipulated. One of the methods mentioned above in conjunction with the loader program signature may again be used in the calculation of signature value and application program signature.

If the calculated signature value and the application program signature are not identical, the check of the authenticity of the application program is unsuccessful, arrow 74. In this case, the control unit is stopped and/or an error message is sent (for example to other control units) or output (for example, on a display device of the control unit) in step 60.

If the calculated signature value and the application program signature are identical, the check of the authenticity of the application program is successful, arrow 76. In this case, it is checked in step 78 whether an update of the loader program is to be carried out.

If no update of the loader program is to be carried out, arrow 80, the execution of the application program is continued, step 82. It should be noted here that this application program may also be an update program for an application program, in contrast to an update program for the loader program. The latter case is explicitly carried out here, since it is connected to the secured control unit startup sequence.

If an update of the control unit is to be carried out, arrow 84, in step 86 an update program (which has been authenticated in steps 70, 72, where it is still referred to as application program) is carried out for the loader program, this program overwrites the memory area in which the loader program is stored, at least partially with update data, for example, of a new version of the loader program. The loader program signature is subsequently recalculated in step 90 based on the rewritten memory area. In step 92, the recalculated loader program signature is stored in the program memory of the HSM instead of the previously applicable loader program memory. The execution of an application program, step 82, (which is to be authenticated, if necessary, before execution) or, if necessary, a restart of the starting device, not shown, may be subsequently continued.

What is claimed is:

1. A method for carrying out a secured startup sequence of a control unit, which includes a host that is configured to execute a loader program and one or multiple application programs, and a hardware security module (HSM) which includes a program memory and a data memory, the method comprising the following steps:

starting the host and the HSM;

after starting the host and HSM, but prior to initializing the data memory of the HSM, authenticating the loader program, stored in a memory of the host, by the HSM using a loader program signature stored in the program memory of the HSM; and executing the loader program by the host when the authentication of the loader program is successful.

2. The method as recited in claim 1, further comprising:
initializing the data memory of the HSM after authentication of the loader program.

3. The method as recited in claim 2, further comprising:
increasing a clock frequency of the HSM after the initialization of the data memory of the HSM.

4. The method as recited in claim 1, further comprising performing, after execution of the loader program:

authenticating at least one application program of the one or of the multiple application programs by the HSM using at least one application program signature stored in the data memory of the HSM; and executing the at least one application program by the host when the authentication of the at least one application program is successful.

5. The method as recited in claim 4, wherein the method further comprises performing, when the at least one application program is an update program for the loader program of the host:

updating the loader program by the update program;

determining a changed loader program signature of the updated loader program of the host;

writing the changed loader program signature into the program memory of the HSM; and restarting the control unit.

6. The method as recited in claim 1, wherein the authentication of the loader program includes:

calculating a signature of a memory area in which the loader program is stored, the signature including a digital signature or a message authentication code (MAC); and comparing the calculated signature with the loader program signature;

wherein the authentication is successful when the calculated signature is identical to the loader program signature, and the authentication being defined as unsuccessful when the calculated signature is not identical to the loader program signature.

7. The method as recited in claim 4, wherein the authentication of the at least one application program includes:

calculating a signature of a memory area in which the at least one application program is stored, the signature including a digital signature or a message authentication code (MAC); and comparing the calculated signature with the application program signature;

wherein the authentication is successful when the calculated signature is identical to the application program signature, and the authentication being defined as unsuccessful when the calculated signature is not identical to the application program signature.

8. The method as recited in claim 1, further comprising:
when the authentication of the loader program is unsuccessful, performing at least one of: stopping the control unit, or sending an error message.

9. The method as recited in claim 1, further comprising:
writing the loader program signature into the program memory of the HSM.

10. A processing unit, comprising:

a host configured to execute a loader program and one or multiple application programs; and a hardware security module (HSM) which includes a program memory and a data memory;

wherein the processing unit is configured to:

start the host and the HSM;

after starting the host and HSM, but prior to initializing the data memory of the HSM, authenticate the loader program, stored in a memory of the host, by the HSM using a loader program signature stored in the program memory of the HSM; and execute the loader program by the host when the authentication of the loader program is successful.

11. A non-transitory machine-readable memory medium on which is stored a computer program for carrying out a secured startup sequence of a processing unit, processing unit including a host that is configured to execute a loader program and one or multiple application programs, and a hardware security module (HSM) which includes a program memory and a data memory, the computer program, when executed by the processing unit, causing the processing unit to perform the following steps:

starting the host and the HSM;

after starting the host and HSM, but prior to initializing the data memory of the HSM, authenticating the loader program, stored in a memory of the host, by the HSM using a loader program signature stored in the program memory of the HSM; and executing the loader program by the host when the authentication of the loader program is successful.

* * * * *